(12) United States Patent
Halberstadt et al.

(10) Patent No.: US 8,920,882 B2
(45) Date of Patent: Dec. 30, 2014

(54) SETTING THE QUANTITY OF COOLING AIR FOR A TURBINE BLADE OR VANE BY CONTROLLED OVERSPRAY

(75) Inventors: Knut Halberstadt, Mülheim an der Ruhr (DE); Sascha Martin Kyeck, Berlin (DE); Francis-Jurjen Ladru, Berlin (DE); Bernhard Siebert, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/274,689

(22) Filed: Oct. 17, 2011

(65) Prior Publication Data
US 2012/0094029 A1 Apr. 19, 2012

(30) Foreign Application Priority Data
Oct. 19, 2010 (EP) ................................. 10188083

(51) Int. Cl.
| | | |
|---|---|---|
| *B05D 1/10* | (2006.01) | |
| *B05D 1/12* | (2006.01) | |
| *B05D 1/08* | (2006.01) | |
| *F01D 5/28* | (2006.01) | |
| *C23C 4/00* | (2006.01) | |
| *C23C 4/12* | (2006.01) | |
| *F01D 5/00* | (2006.01) | |

(52) U.S. Cl.
CPC ............... *F01D 5/288* (2013.01); *C23C 4/005* (2013.01); *C23C 4/12* (2013.01); *F01D 5/005* (2013.01); *Y02T 50/67* (2013.01); *F05D 2230/312* (2013.01); *F05D 2230/90* (2013.01); *F05D 2300/132* (2013.01); *F05D 2300/611* (2013.01); *F05D 2300/2118* (2013.01)
USPC .......................... 427/446; 427/181; 427/236

(58) Field of Classification Search
CPC ........... C23C 4/005; C23C 4/12; F01D 5/005; F01D 5/288; F01D 2300/2118; F01D 2230/312; Y02T 50/67
USPC .......... 427/180, 181, 189, 230, 236, 239, 446
See application file for complete search history.

(56) References Cited

U.S. PATENT DOCUMENTS

| | | |
|---|---|---|
| 4,338,360 A | 7/1982 | Cavanagh et al. |
| 5,941,686 A | 8/1999 | Gupta et al. |
| 6,024,792 A | 2/2000 | Kurz et al. |

FOREIGN PATENT DOCUMENTS

| | | | |
|---|---|---|---|
| EP | 1233081 A1 | | 8/2002 |
| EP | 1 275 749 A1 | * | 1/2003 |
| EP | 1275749 A1 | | 1/2003 |
| EP | 1 632 720 A1 | * | 3/2006 |
| EP | 1632720 A1 | | 3/2006 |
| WO | WO 2008049460 A1 | | 5/2008 |
| WO | WO 2009144109 A1 | | 12/2009 |

* cited by examiner

*Primary Examiner* — William Phillip Fletcher, III

(57) ABSTRACT

A process for coating an edge within a hole in a coated component is provided. The hole is a cooling-air hole operable conduct a coolant therethrough. According to the processes, an outer coating is provided on the outer surface of the component. An inner coating is provided on an inner surface within the hole, wherein the inner coating within the hole takes place using a coating nozzle at a different angle to the coating of the outer surface around the hole, if the spray angles for the outer coating and inner coating relate to the outer surface.

19 Claims, 3 Drawing Sheets

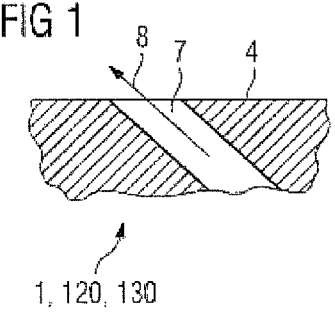
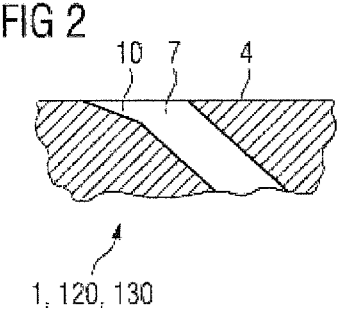
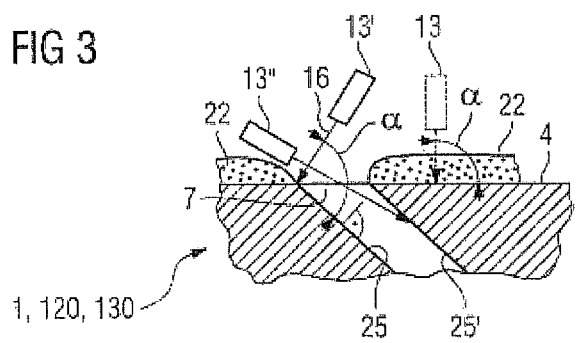
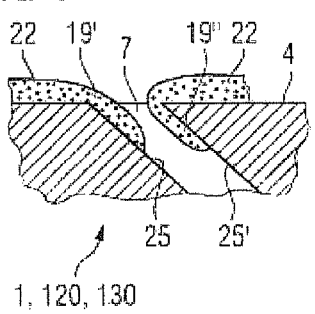
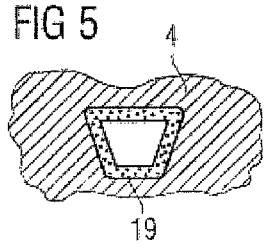

FIG 7

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 6.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 6.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | 0.0001 | 0.002 | 1.5 |

SETTING THE QUANTITY OF COOLING AIR FOR A TURBINE BLADE OR VANE BY CONTROLLED OVERSPRAY

CROSS REFERENCE TO RELATED APPLICATIONS

This application claims priority of European Patent Office application No. 10188083.9 EP filed Oct. 19, 2010, which is incorporated by reference herein in its entirety.

FIELD OF INVENTION

The invention relates to cooled and coated turbine blades or vanes in which the flow rate of the coolant is set.

BACKGROUND OF INVENTION

In various cases, cooled turbine blades or vanes (guide vanes and/or rotor blades) with cooling-air holes have incorrect, in particular excessive, flow rates of the stream of cooling air. This has a negative effect on the efficiency of the gas turbine. The air compressed in the compressor is used as little as possible for cooling, but instead should be fed to the combustion process. Cooling-air openings are understood to mean the following: a cast or bored outlet edge, stem bores (longitudinal bores), EDM or laser shapes (diffusers), cylindrical EDM or laser bores.

The fault pattern or the flow rate to be optimized is often determined relatively late in the process chain.

The declaration of the components as rejects is therefore very costly.

Examples for excessive flow rates are:
faults in the casting; in the boring process; faults in the boring process during upgrades; additional ceramic coating or an increase in the layer thickness or a reduction in conductivity during refurbishment; the base material can also be attacked by the acid during stripping or reworking, such that the size of the cooling-air openings is increased.

SUMMARY OF INVENTION

This problem relating to the excessive flow rates needs to be solved inexpensively.

It is therefore an object of the invention to solve the aforementioned problem.

The object is achieved by the features of the independent claim.

The dependent claims list further advantageous measures which can be combined with one another, as desired, in order to obtain further advantages.

BRIEF DESCRIPTION OF THE DRAWINGS

FIGS. 1-5 show various views of cooling holes with or without overspray,
FIG. 7 shows a list of superalloys.

DETAILED DESCRIPTION OF INVENTION

Figure 6:
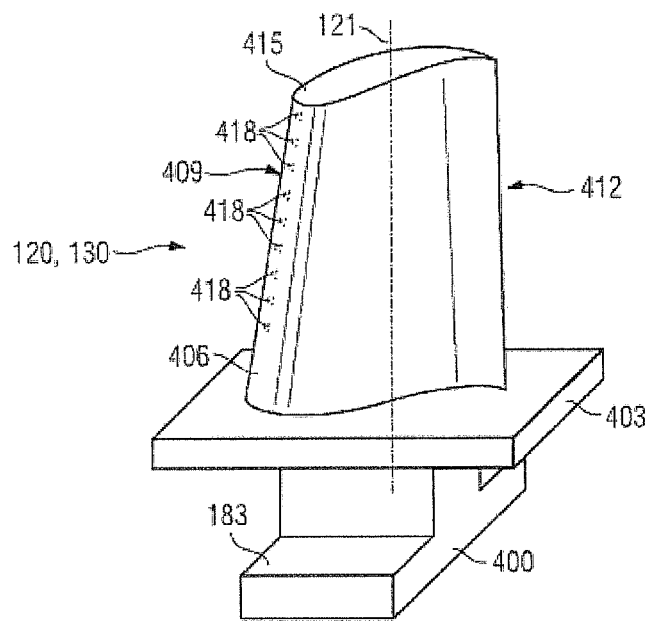
FIG. 6 shows a turbine blade or vane.

The figures and the exemplary embodiments are purely exemplary for the invention.

FIG. 1 shows a component 1 with a hole 7, here a cooling-air hole 7 for example.

Purely by way of example, and in particular, the component 1 is a turbine blade or vane 120, 130 of a turbine, in particular a gas turbine 100, and comprises a superalloy as shown in FIG. 7.

A coolant (air, steam) can escape from the outer surface 4 through the cooling-air hole 7.

With preference, the cooling-air hole 7 can have a constant cross section in the outflow direction 8, or can increase in size starting from a certain distance below the surface 4 to form a diffuser (FIG. 2).

This increase in size can occur continuously in the outflow direction 8, or can be foamed by a diffuser 10 (FIG. 2) in the region of the surface 4, which represents a spreading of the hole starting from a certain depth below the surface 4.

By virtue of a constriction of the cross section in the hole 7, it is possible, in particular, to set the throughput of coolant, if nothing changes in relation to the other conditions, such as the pressure of the escaping cooling medium.

An outer coating 22 comprising a metallic and/or ceramic coating is applied to such components 120, 130 with cooling-air holes.

If the cooling-air holes are not protected, a "coat down" takes place, but this would take place in an uncontrolled manner and is generally avoided.

Here, the coat down is permitted and takes place in a controlled manner.

The outer surface 4 is coated in the position 13 of the coating nozzle at an angle α of between 80° and 100°, preferably 90°.

The position of the nozzle 13 for coating the surface 4 is shown by dashed lines in FIG. 3.

In all the figures, reference signs 13, 13', 13" merely represent various angular positions of the same coating nozzle.

The respective spray angle α always relates to the surface 25, 25', 4 to be coated in each case.

Therefore, as shown in FIG. 3, a constriction is set in a controlled manner by a coating 19', 19" in the hole 7 by setting a coating nozzle 13', as far as possible, at a steep spray angle α of 50°-100°, preferably 80° to 100°, very preferably 90°, to the coated surface 25 in the cooling-air hole 7.

The spray angle α for the inner coating 19', 19" is between 50° and 100°, in particular 80° and 100°, very particularly 90°.

Particularly in the position 13" of the coating nozzle for coating the hole 7 in the region of the undercut, i.e. at an obtuse angle to the outer surface 4, it is not possible to adhere to the spray angle of 90°. Thus, the preferred spray angle α is set, however, at least in some places, in particular for at least 20%, of the inner surface 25, 25'.

The spray angle α between the nozzle 13" and the inner surface 25' should as far as possible be 90°, however.

A constriction 19', 19" is thus produced all around in the hole 7, as shown in FIG. 4, but does not extend completely into the depth of the hole 7 and also does not close the latter.

In particular, the coating 19', 19" runs completely around the entire circumferential line of the cooling-air hole 7, as shown in FIG. 5, an overhead view of a diffuser 10.

It is preferable to use finer powder grains for the coating 19', 19" in the hole 7 than for the coating 22 on the outer surface 4, i.e. the mean size of the grains is preferably at least 10% smaller, very particularly 20% smaller.

Thus, or preferably by virtue of varied production parameters (power of the nozzle), the powder particles for the coating 19', 19" undergo greater fusion, i.e. fusion which is greater preferably by at least 20%, very particularly by 30%, in particular by virtue of a higher temperature of the smaller powder particles. Thus, for the coating 22, the melting temperature of the coarser powder particles is not exceeded, or only the outer shell of the powder particles is incipiently melted (at most 50%, in particular at most 35%), or is melted homogeneously thixotropically between solidus and liquidus. Metallic material, in particular an MCrAl alloy, is used with preference for the coating 19', 19" in the hole 7.

The outer coating comprises a metallic coating, preferably MCrAl, and a ceramic coating, preferably on the basis of $ZrO_2$.

FIG. 6 shows a perspective view of a rotor blade 120 or guide vane 130 of a turbomachine, which extends along a longitudinal axis 121.

Possible coating processes are APS, HVOF, VPS, SPS (Shrouded Plasma Spray, cold gas, . . . ). A metallic metal alloy layer (MCrAlY) is preferably sprayed on.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer.

Columnar grains are produced in the their Jai barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

The invention claimed is:
1. A process for coating an edge within a hole in a coated component, the hole being a cooling-air hole operable to conduct a coolant therethrough, the process comprising:
providing an outer coating on the outer surface of the component, and
providing an inner coating on an inner surface within the hole, wherein the inner coating and the outer coating take place via positioning of a coating nozzle at a first angle and a second angle respectively, wherein the first angle is different from the second angle, wherein the first and second angles are with respect to the other surface, wherein a spray angle for inner coating for at least a portion of the inner surface is the same as a spray angle for the coating on the outer surface, wherein the spray angle for the inner coating is the angle of the coating nozzle with respect to the inner surface and the spray angle for the outer coating is the angle of the coating nozzle with respect to the outer surface.

2. The process as claimed in claim 1, wherein said at least a portion of the inner surface comprises at least 20% of the inner surface.

3. The process as claimed in claim 1, wherein the process is used in the case of symmetrical longitudinal bores, holes with a diffuser and/or in the region of outlet edges with holes.

4. The process as claimed in claim 1, wherein the inner and outer coatings each comprises a powder, and wherein the powder particles for the inner coating undergo complete fusion.

5. The process as claimed in claim 1, wherein the spray angle of the inner coating with respect to the inner surface is between 50° and 100°.

6. The process as claimed in claim 1, wherein a metallic coating is provided as the inner coating of the hole.

7. The process as claimed in claim 6, wherein an MCrAlX alloy is included in the metallic inner coating.

8. The process as claimed in claim 1, wherein the spray angle for the outer coating with respect to the outer surface is between 80° and 100°.

9. The process as claimed in claim 1, wherein a metallic and ceramic layer is provided as the outer coating.

10. The process as claimed in claim 1, wherein the same material is included in the outer coating and inner coating.

11. The process as claimed in claim 1, wherein the hole is not closed, and wherein the hole is not completely coated into its entire depth.

12. The process as claimed in claim 11, wherein the hole is coated in a region of a diffuser.

13. A process for coating an edge within a hole in a coated component, the hole being a cooling-air hole operable to conduct a coolant therethrough, the process comprising:
providing an outer coating on the outer surface of the component, and
providing an inner coating on an inner surface within the hole, wherein the inner coating and the outer coating take place via positioning of a coating nozzle at a first angle and a second angle respectively, wherein the first angle is different from the second angle, wherein the first and second angles are with respect to the outer surface, wherein the inner coating and the outer coating each comprises a powder, and wherein the inner coating comprises finer powder grains than the outer coating.

14. The process as claimed in claim 13, wherein powder grains of the inner coating have a mean diameter which is at least 10% smaller than that of the outer coating.

15. A process for coating an edge within a hole in a coated component, the hole being a cooling-air hole operable to conduct a coolant therethrough, the process comprising:
providing an outer coating on the outer surface of the component, and
providing an inner coating on an inner surface within the hole, wherein the inner coating and the outer coating take place via positioning of a coating nozzle at a first angle and a second angle respectively, wherein the first angle is different from the second angle, wherein the first and second angles are with respect to the outer surface, wherein the inner coating and the outer coating each comprises a powder, and wherein the powder particles, as a result of coating parameters and/or powder properties, have a higher degree of powder fusion for the inner coating compared to the outer coating.

16. The process as claimed in claim 15, wherein the coatings are provided by a thermal spraying process.

17. The process as claimed in claim 16, wherein the coatings are provided via an HVOF process.

18. A process for coating an edge within a hole in a coated component, the hole being a cooling-air hole operable to conduct a coolant therethrough, the process comprising:
providing an outer coating on the outer surface of the component, and
providing an inner coating on an inner surface within the hole, wherein the inner coating and the outer coating take place via positioning of a coating nozzle at a first angle and a second angle respectively, wherein the first angle is different from the second angle, wherein the first and second angles are with respect to the outer surface, wherein the inner coating and the outer coating each comprises a powder, and in which the powder particles for the outer coating undergo only partial fusion.

19. The process as claimed in claim 18, wherein the powder particles for the outer coating undergo fusion to the extent of at most 50%.

* * * * *